Patented Oct. 31, 1950

2,527,680

UNITED STATES PATENT OFFICE 2,527,680

ALPHA THENYL CHLORIDE FROM HYDROGEN CHLORIDE-FORMALDEHYDE SOLUTION AND THIOPHENE

Lucas P. Kyrides, St. Louis, and Donald G. Sheets, Lemay, Mo., assignors to Monsanto Chemical Company, St. Louis, Mo., a corporation of Delaware No Drawing. Application June 21, 1945,
Serial No. 600,838

6 Claims. (Cl. 260—329)

This invention relates to halogenated sulfur-containing hydrocarbons and more particularly to a novel process for preparing alpha-thenyl chloride.

Alpha-thenyl chloride, also known as alpha-thienyl chloromethane, has been prepared by the addition of a concentrated aqueous formaldehyde solution into a mixture of the thiophene and concentrated hydrochloric acid while passing in a rapid stream of hydrogen chloride. The yield of alpha-thenyl chloride, however, is low by this process. Moreover, a large portion of the thiophene used as starting material is converted into di-2-thienyl methane during the reaction and the yield of this side-reaction product is frequently as large or greater than the yield of alpha-thenyl chloride by this process. In addition, the results obtained by this process may vary widely and are not readily duplicated from batch to batch.

According to the present invention, generally stated, a concentrated aqueous solution of formaldehyde is cooled, for example, to 0° C., and then saturated under external cooling conditions with hydrogen chloride. In a preferred embodiment of the present invention, a solution of formaldehyde in concentrated hydrochloric acid may be saturated with hydrogen chloride with external cooling. The cold solution is then added to cooled thiophene, regulating the addition of the solution and providing external cooling means to remove all or part of the heat evolved in the exothermic reaction. Alpha-thenyl chloride is then recovered from the reaction mixture by any desired procedure, for example, by diluting the reaction mixture with cool water, separating the heavy water-immiscible layer, and extracting the aqueous layer with a water-immiscible organic solvent for alpha-thenyl chloride. The heavy layer and the extract are then combined, washed with water and an alkaline agent such as sodium bicarbonate, subsequently washed with water again and dried over a dehydrating agent such as anhydrous sodium sulfate. The dried material may then be fractionated to recover residual unreacted thiophene and alpha-thenyl chloride. The yield of alpha-thenyl chloride by the process of the present invention is good and the proportion of side-reaction products is relatively small. The residual unreacted thiophene may be used in the preparation of subsequent batches of alpha-thenyl chloride. It is desirable to use an extraction solvent which has a substantial boiling point differential with respect to the boiling points of alpha-thenyl chloride and thiophene, in order to facilitate stripping of the solvent from the alpha-thenyl chloride-thiophene mixture in the fractionation operation.

The following examples will serve to illustrate the novel process of the present invention:

Example I

In a separate vessel, a mixture of 324 g. 300 cc.; 4 moles) of 37% aqueous formaldehyde solution and 344 cc. (4 moles) of concentrated hydrochloric acid was cooled to 0° C. and saturated with hydrogen chloride with external cooling. The weight of hydrogen chloride required for saturation was 311 g. The resulting cold solution was gradually added to 336 g. (4 moles) of thiophene. The temperature at the start of the addition was —10° C. and the final temperature was 1° C. The addition was made in 35 minutes. Subsequently 450 cc. of cold water was added to the reaction mixture and a heavy water-immiscible layer was formed. This layer was separated from the aqueous layer. The aqueous layer was extracted with petroleum ether. The extract was combined with the heavy layer and the combination was consecutively washed with water, sodium bicarbonate solution and then with water. The washed material was dried over anhydrous sodium sulfate and subsequently fractionally distilled. There was obtained 93.5 g. of thiophene and 236.2 g. of alpha-thenyl chloride, B. P. 71° C./16 mm. The yield of alpha-thenyl chloride was, therefore, 61.8% based on thiophene consumed. Approximately 27.7% of the thiophene employed as starting material was consumed in the formation of side-reaction products which appeared to consist chiefly of bis-(chloromethyl)-thiophene. The results were found to be capable of duplication consistently.

Example II

A mixture of 41 g. (38 cc., 0.5 mole) of 37% formaldehyde and 43 cc. (0.5 mole) of concentrated hydrochloric acid was saturated with hydrogen chloride at 3° C. The weight of hydrogen chloride required for saturation was 44 g. To the resulting solution was added gradually 42 g. (0.5 mole) of thiophene over a period of 30 minutes. External cooling was applied. The temperature in the reaction mixture ranged from —9° C. to —4° C. The mixture was thoroughly agitated during the reaction period. After the reaction was completed, 56 cc. of cold water was added and the lower layer containing the product was separated from the aqueous layer. The aqueous layer was extracted with petroleum ether, combined with the ether extract and the mixture was washed with water, sodium bicarbonate solution and then with water. The washed mixture was dried over anhydrous sodium sulfate and thereafter fractionally distilled. There was obtained 16.1 g. of unreacted thiophene and 21.3 g. of alpha-thenyl chloride, B. P. 74–84° C./20 mm. Yield of alpha-thenyl chloride, 52.2% based on the thiophene consumed. A residue of 9.9 g. remained. This residue was chiefly bis-(chloromethyl)-thiophene.

In contrast to the results obtained by the process of the present invention, the procedure reported by Blicke and Burckhalter in J. A. C. S. 64, 478 (1942), which consisted of adding a 40% formaldehyde solution to a mixture of thiophene and concentrated hydrochloric acid while passing in a rapid stream of hydrogen chloride, afforded a yield of 40% of alpha-thenyl chloride and 38% of the side-reaction product, di-2-thenyl methane. In the Blicke and Burckhalter procedure as reported, 60.5% of the thiophene employed as the starting material was consumed in the formation of side-reaction products with possibly some unreacted thiophene remaining (although the reference does not indicate recovery of any unreacted thiophene). Using the Blicke and Burckhalter procedure, the results were found to be quite variable, the average yields of alpha-thenyl chloride obtained being substantially lower than the yield reported in the reference, and no unreacted thiophene was recovered.

It has been found that in the practice of the process reported by Blicke and Burckhalter there is a tendency for emulsions to form when the reaction mixture is diluted with water. These emulsions tend to render a separation of the alpha-thenyl chloride-containing portion exceedingly difficult. By the process of the present invention, these emulsions do not appear to form and separation is thereby more readily accomplished.

In the practice of the process of the present invention any water-immiscible organic solvent for alpha-thenyl chloride may be employed in place of petroleum ether for the extraction of the aqueous layer and desirably a solvent having a substantial boiling point differential with respect to the boiling points of alpha-thenyl chloride and of thiophene. Likewise, any water-soluble weak alkaline agent may be used in place of sodium bicarbonate solution in washing the extract. Any desired temperature of the formaldehyde-hydrochloric acid solution may be employed during the saturation of the solution with hydrogen chloride. At lower temperatures a larger quantity of gas is absorbed. In practice, it has been found desirable to cool the solution to 0° C. Any desired temperature range may be selected for the reaction of the formaldehyde-HCl mixture with the thiophene and likewise any period of time for combination of the two reactants. It is desirable to avoid high temperatures in order to minimize side reactions and possible loss of thiophene by vaporization at higher temperatures. The range of −10° C. to 1° C. has been found very satisfactory. However, the process of the present invention is not to be construed as limited to any particular conditions of operation sequence or materials except as described and defined by the claims.

We claim:

1. A process of preparing alpha-thenyl chloride comprising gradually mixing thiophene and a cold aqueous hydrogen chloride-saturated solution of formaldehyde under external cooling conditions and recovering alpha-thenyl chloride from the mixture.

2. A process of preparing alpha-thenyl chloride comprising saturating a cold aqueous mixture of formaldehyde and hydrochloric acid with hydrogen chloride, adding the resulting solution gradually to thiophene and recovering alpha-thenyl chloride from the reaction mixture.

3. A process of preparing alpha-thenyl chloride comprising gradually adding thiophene to a cold aqueous hydrogen chloride-saturated solution of formaldehyde under external cooling conditions and recovering alpha-thenyl chloride from the reaction mixture.

4. A process of preparing alpha-thenyl chloride comprising cooling an aqueous mixture of equal moles of formaldehyde and hydrochloric acid, saturating the mixture with hydrogen chloride, adding the resulting solution gradually to thiophene with agitation of the reaction mixture and external cooling, subsequently diluting the reaction mixture with water, separating the heavy water-immiscible layer formed, extracting the aqueous layer with a water-immiscible organic solvent for alpha-thenyl chloride, combining the heavy layer and extract, washing said combined portion consecutively with water, an alkaline agent and finally with water, drying the alpha-thenyl chloride containing portion and recovering alpha-thenyl chloride and residual unreacted thiophene in separate fractions from said portion by fractional distillation.

5. A process of preparing alpha-thenyl chloride comprising cooling an aqueous mixture of equal moles of formaldehyde and hydrochloric acid, saturating the mixture with hydrogen chloride, adding thiophene gradually to said mixture, subsequently diluting the reaction mixture with water, separating the heavy water-immiscible layer formed, extracting the aqueous layer with a water-immiscible organic solvent for alpha-thenyl chloride, combining the heavy layer and extract, washing said combined portion consecutively with water, an alkaline agent and finally with water, drying the alpha-thenyl chloride containing portion and recovering alpha-thenyl chloride and residual unreacted thiophene in separate fractions from said portion by fractional distillation.

6. A process of preparing alpha-thenyl chloride comprising adding gradually a cold aqueous, hydrogen chloride-saturated solution of formaldehyde to thiophene under external cooling conditions and recovering alpha-thenyl chloride from the reaction mixture.

LUCAS P. KYRIDES.
DONALD G. SHEETS.

REFERENCES CITED

The following references are of record in the file of this patent:

UNITED STATES PATENTS

| Number | Name | Date |
|---|---|---|
| 1,910,475 | Reddelien | May 23, 1933 |
| 2,469,334 | Hartough | May 3, 1949 |

OTHER REFERENCES

Groggins, Unit Processes in Organic Synthesis, Edition 2, page 222, McGraw-Hill, N. Y. 1938.

Blicke and Burckhalter, J. Am. Chem. Soc. 64, 478 (1942).

Organic Reactions, vol. 1, pages 67, 68, 69, John Wiley & Sons, N. Y. 1942.